US010585772B2

(12) United States Patent
Katrak

(10) Patent No.: US 10,585,772 B2
(45) Date of Patent: Mar. 10, 2020

(54) POWER SUPPLY DIAGNOSTIC STRATEGY

(71) Applicant: TRW Automotive U.S. LLC, Livonia, MI (US)

(72) Inventor: Kerfegar K. Katrak, Kalamazoo, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 1224 days.

(21) Appl. No.: 14/447,595

(22) Filed: Jul. 30, 2014

(65) Prior Publication Data

US 2015/0012781 A1 Jan. 8, 2015

Related U.S. Application Data

(63) Continuation-in-part of application No. 14/296,434, filed on Jun. 4, 2014, now abandoned.
(Continued)

(51) Int. Cl.
*G06F 11/24* (2006.01)
*G06F 11/30* (2006.01)
(Continued)

(52) U.S. Cl.
CPC .............. *G06F 11/24* (2013.01); *G06F 11/10* (2013.01); *G06F 11/3058* (2013.01); *G06F 11/3013* (2013.01); *H02H 1/0092* (2013.01)

(58) Field of Classification Search
CPC .... G06F 1/206; G06F 1/26; G06F 2003/0692; G06F 21/305; G06F 21/31;
(Continued)

(56) References Cited

U.S. PATENT DOCUMENTS 6,055,145 A * 4/2000 Lagree ..................... G06J 1/00
 361/115
6,545,852 B1 * 4/2003 Arnold .................... B60T 8/885
 361/152

(Continued)

FOREIGN PATENT DOCUMENTS

| CN | 1462105 A | 12/2003 |
| CN | 101165508 A | 4/2008 |
| EP | 2555004 A1 | 2/2013 |

OTHER PUBLICATIONS https://www.avr-tutorials.com/general/comparison-between-microcontroller-and-microprocessor (Year: 2012).*
(Continued)

*Primary Examiner* — Roy Y Yi
(74) *Attorney, Agent, or Firm* — MacMillan, Sobanski & Todd, LLC

(57) ABSTRACT

A power supply diagnostic strategy for discrete power supply diagnostic states is independent of the underlying memory structure. The values used in the associated algorithm are selected to ensure that random linked failures will be detected. This applies to planar memory structures with 1, 2, 4, 6, 8, 12, and 16 common lattices, or physical memory structures with individual bit dispersed memories with 1, 2, 4, 6, 8, 12, and 16 consecutive bit splices. Further, the strategy provides that the various monitored voltage tables remains distinct even with compiler optimization activated.

17 Claims, 15 Drawing Sheets

Related U.S. Application Data

(60) Provisional application No. 61/860,032, filed on Jul. 30, 2013, provisional application No. 61/830,934, filed on Jun. 4, 2013.

(51) Int. Cl.
*G06F 11/10* (2006.01)
*H02H 1/00* (2006.01)

(58) Field of Classification Search
CPC .. G06F 2201/86; G06F 3/0601; G06F 3/0613; G06F 3/0619; G06F 3/0635; G06F 3/064; G06F 3/0652; G06F 3/0689; G06F 9/30032
See application file for complete search history.

(56) References Cited

U.S. PATENT DOCUMENTS

| | | | |
|---|---|---|---|
| 6,732,285 B1 | 5/2004 | Sommer et al. | |
| 7,045,915 B2 | 5/2006 | Otani et al. | |
| 7,135,789 B2* | 11/2006 | Boros | G06F 1/26 307/43 |
| 7,242,329 B2 | 7/2007 | Katrak | |
| 7,725,782 B2 | 5/2010 | Katrak | |
| 2001/0001319 A1 | 5/2001 | Beckert et al. | |
| 2003/0016770 A1* | 1/2003 | Trans | H04B 1/00 375/346 |
| 2004/0042135 A1 | 3/2004 | Strutt et al. | |
| 2004/0145242 A1 | 7/2004 | Rodriguez et al. | |
| 2005/0250557 A1 | 11/2005 | Marschalkowski et al. | |
| 2006/0146467 A1 | 7/2006 | Ruan et al. | |
| 2007/0174698 A1 | 7/2007 | Bailey et al. | |
| 2008/0244279 A1 | 10/2008 | Godzinski et al. | |
| 2009/0089604 A1 | 4/2009 | Malik et al. | |
| 2009/0138740 A1 | 5/2009 | Fan | |
| 2010/0103567 A1 | 4/2010 | Saeck et al. | |
| 2010/0332715 A1 | 12/2010 | Hadden et al. | |
| 2011/0022871 A1 | 1/2011 | Bouvier et al. | |
| 2012/0173924 A1* | 7/2012 | Xiao | G06F 11/1048 714/15 |
| 2013/0173970 A1* | 7/2013 | Kleveland | G11C 29/44 714/710 |

OTHER PUBLICATIONS http://web.mit.edu/6.02/www/f2006/handouts/bits_ecc.pdf (Year: 2006).*
PCT/US2014/040967 International Search Report and Written Opinion, dated Oct. 23, 2014.
PCT/US2014/048986 International Search Report and Written Opinion, dated Oct. 29, 2014.
Chinese Notification of First Office Action, Application No. 201480042821.X, dated Feb. 23, 2018.

* cited by examiner

| SET 1 (balanced) | | | | | | SET 2 (unbalanced) | | | | | |
|---|---|---|---|---|---|---|---|---|---|---|---|
| Bin. | | | H=2 | Dec | Hex | Bin. | | | H=2 | Dec | Hex |
| 0 | 0 | 0 | 0 | 0 | 0 | 1 | 0 | 0 | 0 | 8 | 8 |
| 0 | 0 | 1 | 1 | 3 | 3 | 1 | 0 | 1 | 1 | 11 | B |
| 0 | 1 | 1 | 0 | 6 | 6 | 1 | 1 | 1 | 0 | 14 | E |
| 0 | 1 | 0 | 1 | 5 | 5 | 1 | 1 | 0 | 1 | 13 | D |
| 1 | 1 | 0 | 0 | 12 | C | 0 | 0 | 0 | 1 | 1 | 1 |
| 1 | 1 | 1 | 1 | 15 | F | 0 | 0 | 1 | 0 | 2 | 2 |
| 1 | 0 | 1 | 0 | 10 | A | 0 | 1 | 1 | 1 | 7 | 7 |
| 1 | 0 | 0 | 1 | 9 | 9 | 0 | 1 | 0 | 0 | 4 | 4 |

Fig. 3

| Word (Control or Diagnostic) ||||||
|---|---|---|---|---|---|
| Upper Byte (Set 1) ||| Lower Byte (Set 2) |||
| Monitored Voltage Indentifier | Control/ Diagnostic Path Indentifier || Voltage Status Indicator |||
| USNb (Hex) H=2 Bin. (Dec.)(Hex) | LSNb H=4 Bin. (Dec.)(Hex) | | USNb H=2 Bin. (Dec.)(Hex) | LSNb H=2 Bin. (Dec.)(Hex) | Lower Byte H=4 USNb + LSNb (Hex) |
| 0000 (0)  (0) | 1111 (15) (F) | | 0111 (7)  (7) | 0100 (4) (4) | 74 |
| 0011 (3)  (3) | 0000 (0)  (0) | | 1011 (11) (B) | 0010 (2) (2) | B2 |
| 0110 (6)  (6) | | | 1101 (13) (D) | 0001 (1) (1) | D1 |
| 0101 (5)  (5) | | | 1110 (14) (E) | 1000 (8) (8) | E8 |
| 1100 (12) (B) | | | | | |
| 1111 (15) (F) | | | | | |
| 1010 (10) (A) | | | | | |
| 1001 (9)  (9) | | | | | |

Fig. 4

| Control Path - Voltage Va | | Control Status Value Stored | |
|---|---|---|---|
| Voltage Monitored Va | | | Lower Byte (Hex) H=4 |
| OV | UV | | |
| No | No | | 74 |
| No | Yes | | B2 |
| Yes | No | | D1 |
| Yes | Yes | | E8 |

Fig. 5

| Control Path - Voltage Va | | | Status Value | |
|---|---|---|---|---|
| Voltage Monitor Va | Lower Byte | | | Lower Byte |
| OV | UV | USNb (Hex) H=2 | LSNb (Hex) H=2 | (Hex) H=4 |
| No | No | 7 | 4 | 74 |
| No | Yes | B | 2 | B2 |
| Yes | No | D | 1 | D1 |
| Yes | Yes | E | 8 | E8 |

Fig. 6

| Control Path - Voltage Va | | | | Control Status Value | | Control Stored Value | |
|---|---|---|---|---|---|---|---|
| Voltage Monitor Va | | Lower Byte | | | Lower Byte (Hex) H=4 | Lower Byte Match | Lower Byte No Match |
| OV | UV | USNb (Hex) H=2 | LSNb (Hex) H=2 | | | | |
| No | No | 7 | 4 | | 74 | 74 | F0 |
| No | Yes | B | 2 | | B2 | B2 | F0 |
| Yes | No | D | 1 | | D1 | D1 | F0 |
| Yes | Yes | E | 8 | | E8 | E8 | F0 |

Fig. 7

Control Path - Voltage Va

| Voltage Monitor Va | | Upper Byte | | Lower Byte | | Control Status Value | Control Stored Value | |
|---|---|---|---|---|---|---|---|---|
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | 3 | F | 7 | 4 | 74 | 74 | F0 |
| No | Yes | 3 | F | B | 2 | B2 | B2 | F0 |
| Yes | No | 3 | F | D | 1 | D1 | D1 | F0 |
| Yes | Yes | 3 | F | E | 8 | E8 | E8 | F0 |

Diagnostic Path - Voltage Va

| Voltage Monitor Va | | Upper Byte | | Lower Byte | | Diagnostic Status Value | Diagnostic Stored Value | |
|---|---|---|---|---|---|---|---|---|
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | A | 0 | 4 | 7 | 47 | 47 | 0F |
| No | Yes | A | 0 | 2 | B | 2B | 2B | 0F |
| Yes | No | A | 0 | 1 | D | 1D | 1D | 0F |
| Yes | Yes | A | 0 | 8 | E | 8E | 8E | 0F |

Fig. 8

Control Path - Voltage Va

| Voltage Monitor Va | | Upper Byte | | Lower Byte | | Control Status Value | Control Stored Value | |
|---|---|---|---|---|---|---|---|---|
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | 3 | F | 7 | 4 | 74 | 74 | F0 |
| No | Yes | 3 | F | B | 2 | B2 | B2 | F0 |
| Yes | No | 3 | F | D | 1 | D1 | D1 | F0 |
| Yes | Yes | 3 | F | E | 8 | E8 | E8 | F0 |

Control Path - Voltage Vb

| Voltage Monitor Vb | | Upper Byte | | Lower Byte | | Control Status Value | Control Stored Value | |
|---|---|---|---|---|---|---|---|---|
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | A | F | 7 | 4 | 74 | 74 | F0 |
| No | Yes | A | F | B | 2 | B2 | B2 | F0 |
| Yes | No | A | F | D | 1 | D1 | D1 | F0 |
| Yes | Yes | A | F | E | 8 | E8 | E8 | F0 |

Fig. 9

Control Path - Voltage Va

| Voltage Monitor Va | | Lower Byte | | | Control Status Value | Control Stored Value | |
|---|---|---|---|---|---|---|---|
| | | Upper Byte | | | | | |
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | 3 | F | 7 | 4 | 74 | 74 | F0 |
| No | Yes | 3 | F | B | 2 | B2 | B2 | F0 |
| Yes | No | 3 | F | D | 1 | D1 | D1 | F0 |
| Yes | Yes | 3 | F | E | 8 | E8 | E8 | F0 |

Diagnostic Path - Voltage Va

| Voltage Monitor Va | | Lower Byte | | | Diagnostic Status Value | Diagnostic Stored Value | |
|---|---|---|---|---|---|---|---|
| | | Upper Byte | | | | | |
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | 3 | 0 | 4 | 7 | 47 | 47 | 0F |
| No | Yes | 3 | 0 | 2 | B | 2B | 2B | 0F |
| Yes | No | 3 | 0 | 1 | D | 1D | 1D | 0F |
| Yes | Yes | 3 | 0 | 8 | E | 8E | 8E | 0F |

Fig. 10a

Control Path - Voltage Vb

| Voltage Monitor Vb | | Upper Byte | | Lower Byte | | Control Status Value | Control Stored Value | |
|---|---|---|---|---|---|---|---|---|
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | A | F | 7 | 4 | 74 | 74 | F0 |
| No | Yes | A | F | B | 2 | B2 | B2 | F0 |
| Yes | No | A | F | D | 1 | D1 | D1 | F0 |
| Yes | Yes | A | F | E | 8 | E8 | E8 | F0 |

Diagnostic Path - Voltage Vb

| Voltage Monitor Vb | | Upper Byte | | Lower Byte | | Diagnostic Status Value | Diagnostic Stored Value | |
|---|---|---|---|---|---|---|---|---|
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | A | 0 | 4 | 7 | 47 | 47 | 0F |
| No | Yes | A | 0 | 2 | B | 2B | 2B | 0F |
| Yes | No | A | 0 | 1 | D | 1D | 1D | 0F |
| Yes | Yes | A | 0 | 8 | E | 8E | 8E | 0F |

Fig. 10b

Control Path - Voltage Va

| Voltage Monitor Va | | Upper Byte | | Lower Byte | | Control Status Value | Control Stored Value | |
|---|---|---|---|---|---|---|---|---|
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | 3 | F | 7 | 4 | 74 | 7 | F |
| No | Yes | 3 | F | B | 2 | B2 | B | F |
| Yes | No | 3 | F | D | 1 | D1 | D | F |
| Yes | Yes | 3 | F | E | 8 | E8 | E | F |

Diagnostic Path - Voltage Va

| Voltage Monitor Va | | Upper Byte | | Lower Byte | | Diagnostic Status Value | Diagnostic Stored Value | |
|---|---|---|---|---|---|---|---|---|
| OV | UV | USNb (Hex) | LSNb (Hex) | USNb (Hex) H=2 | LSNb (Hex) H=2 | Lower Byte (Hex) H=4 | Lower Byte Match | Lower Byte No Match |
| No | No | 3 | 0 | 4 | 7 | 47 | 7 | 0 |
| No | Yes | 3 | 0 | 2 | B | 2B | B | 0 |
| Yes | No | 3 | 0 | 1 | D | 1D | D | 0 |
| Yes | Yes | 3 | 0 | 8 | E | 8E | E | 0 |

Fig. 13a

| Control Path - Voltage Vb | | | | | | | |
|---|---|---|---|---|---|---|---|
| Voltage Monitor Vb | | Upper Byte | | Lower Byte | | Control Status Value | Control Stored Value |
| OV | UV | USNb (Hex) | LSNb (Hex) | USNb (Hex) H=2 | LSNb (Hex) H=2 | Lower Byte (Hex) H=4 | Lower Byte No Match |
| No | No | A | F | 7 | 4 | 74 | 4 |
| No | Yes | A | F | B | 2 | B2 | 2 |
| Yes | No | A | F | D | 1 | D1 | 1 |
| Yes | Yes | A | F | E | 8 | E8 | 8 |

| Diagnostic Path - Voltage Vb | | | | | | | |
|---|---|---|---|---|---|---|---|
| Voltage Monitor Vb | | Upper Byte | | Lower Byte | | Diagnostic Status Value | Diagnostic Stored Value |
| OV | UV | USNb (Hex) | LSNb (Hex) | USNb (Hex) H=2 | LSNb (Hex) H=2 | Lower Byte (Hex) H=4 | Lower Byte No Match |
| No | No | A | 0 | 4 | 7 | 47 | 4 |
| No | Yes | A | 0 | 2 | B | 2B | 2 |
| Yes | No | A | 0 | 1 | D | 1D | 1 |
| Yes | Yes | A | 0 | 8 | E | 8E | 8 |

Fig. 13b

POWER SUPPLY DIAGNOSTIC STRATEGY

CROSS-REFERENCE TO RELATED APPLICATIONS

This application claims the benefit of U.S. Provisional Application No. 61/860,032, filed Jul. 30, 2013. This application is also a continuation-in-part patent application of U.S. patent application Ser. No. 14/296,434, filed Jun. 4, 2014, which claims priority to U.S. Provisional Application No. 61/830,934, filed Jun. 4, 2013. The disclosures of these applications are incorporated herein by reference in their entirety.

BACKGROUND OF THE INVENTION

This invention relates in general to a method of analyzing and monitoring discrete power supply diagnostic states, and particularly to analyzing computer microprocessor system voltages.

Linked memory random hardware failures can occur along the edges or lattices in planar memory. In planar memory structures, it is possible to have 1, 2, 4, 6, 8, 12, and 16 common lattices. For example, 4 lattices or edges occur when either 2 strips of planar memory set up back to back along with 2 other parallel strips of planar memory. The planar memory structure lattices were typically used by CISC (Complex Instruction Set Controllers).

Linked memory random hardware failures can occur when column multiplexing using one or more bits is used in dispersed physical memory. In existing dispersed memory structures, it is possible to have 1, 2, and 4 bit column multiplexing. When one bit column multiplexing is used for "n" addresses, there is the potential for 1 and 2 bit linked physical dispersed memory failures. Similar linked physical dispersed memory failures are feasible for 2 bit and 4 bit column multiplexing. Additionally 6, 8, 12, or 16 linked memory failures may occur in physically dispersed memory.

SUMMARY OF THE INVENTION

The approach in this invention for monitoring discrete power supply diagnostic states is independent of the underlying memory structure. With the described approaches, the values used are selected to ensure that random hardware linked errors will be detected. This applies to either planar memory structures with 1, 2, 4, 6, 8, 12, and 16 common lattices, or physical memory structures with individual bit dispersed memories with 1, 2, 4, 6, 8, 12, and 16 consecutive bit splices.

According to one aspect of the invention, a method is provided for diagnosing the status of an operating voltage comprising the steps of: (a) using a processor to read an operating voltage and to determine one of the following states: (1) "no" over voltage (OV), "no" under voltage (UV); (2) "no" OV, "yes" UV; (3) "yes" OV, "no" UV or (4) "yes" OV, "yes" UV; (b) assigning a distinct byte value for each of the states identified in step (a), wherein the distinct values are selected having a hamming distance of at least 4 between functional and failure mode values; and (c) storing an operating status value corresponding to the determined operating state in a designated memory location of the processor. Each distinct byte value of step (b) may include an upper significant nibble (USNb) and a lower significant (LSNb), and wherein all of the USNbs are distinct and are selected having a hamming distance of at least 2, and all the LSNbs are distinct and are selected having a hamming distance of at least 2. Preferably, each of the USNbs and LSNbs are chosen from an unbalanced set of nibble values, and are chosen for each distinct value such that they are not complements of one another. Prior to step (c), the distinct byte value may be checked for a match with one of a group of defined values and, if there is a match, the distinct byte value is stored as the operating status value and, if there is no match, a separate "no match" value is stored. Also preferably, the distinct byte value of step (b) is a lower byte of a word and further includes the step of assigning an upper byte value to the word, the upper byte value including a USNb and a LSNb, and wherein one of the USNb and LSNb is a monitored voltage identifier and the other one is a control/diagnostic path identifier. For the upper byte, each of the USNbs and LSNbs are chosen from a balanced set of nibble values. The use of the upper byte ensures each monitored voltage table remains distinct even with compiler optimization activated.

According to another aspect of the invention, a method is provided for diagnosing the status of an operating voltage comprising:
(a) using a processor to read an operating voltage and to determine one of the following control states: (1) "no" OV, "no" UV; (2) "no" OV, "yes" UV; (3) "yes" OV, "no" UV or (4) "yes" OV, "yes" UV;
(b) assigning a distinct control byte value for each of the control states identified in step (a);
(c) storing an operating control status value corresponding to the determined operating state in a designated control memory location of the processor.
(d) using the processor of step (a) to read the operating voltage and to determine one of the following diagnostic states: (1) "no" OV, "no" UV; (2) "no" OV, "yes" UV; (3) "yes" OV, "no" UV or (4) "yes" OV, "yes" UV;
(e) assigning a distinct diagnostic byte value for each of the states identified in step (d);
(f) storing an operating diagnostic status value corresponding to the determined operating state in a designated diagnostic memory location of the processor; and
(g) comparing the operating control status value with the operating diagnostic status value to determine whether the control voltage state read in step (a) agrees with the diagnostic voltage state read in step (d).

In this method, different control byte and diagnostic byte are provided based on complementary nibble "mirror" values.each distinct control byte value of step (b) includes a USNb and a LSNb, and all of the USNbs and LSNbs are distinct. Similarly, each distinct diagnostic byte value of step (f) includes a USNb and a LSNb, and all of the USNbs and LSNbs are also distinct. Preferably, the USNb and LSNb of the diagnostic byte value are mirrored with respect to the USNb and LSNb of the corresponding control byte value. In one version, both the USNb and LSNb of the diagnostic byte value are compared to the mirrored USNb and LSNb of the corresponding control byte value. In another version, such as when the processor has Single bit Error Correction and Double bit Error Detection (SECDED), only one of the USNb and LSNb of the diagnostic byte value is compared to one of the mirrored USNb and LSNb of the corresponding control byte value.

Preferably, prior to step (c), the distinct control byte value is checked for a match with one of a group of defined control values and, if there is a match, the distinct control byte value is stored as the operating control status value and, if there is no match, a separate "no match" control value is stored. Similarly, prior to step (f), the distinct diagnostic byte value is checked for a match with one of a group of defined diagnostic values and, if there is a match, the distinct diagnostic byte value is stored as the operating diagnostic status value and, if there is no match, a separate "no match" diagnostic value is stored.

According to a further aspect of the invention, a method of analyzing a power supply system is provided wherein a source input voltage is supplied to a first processor and an output voltage is generated by the first processor comprising the steps of: (a) using the first processor to determine a source operating status of the source input voltage; (b) using a second processor to determine an output operating status of the output voltage from the first processor; (c) sending the source operating status to the second processor; and (d) using the processor to analyze the source and output statuses to determine a system diagnosis as a function of both the source and output statuses. Preferably, the source operating status is sent to the second processor with no checksum or cyclic redundancy check (CRC).

Various aspects of this invention will become apparent to those skilled in the art from the following detailed description of the preferred embodiment, when read in light of the accompanying drawings.

BRIEF DESCRIPTION OF THE DRAWINGS

FIG. 3 is a representative table showing a method of segregating a group of binary nibble values into a balanced Set 1 and an unbalanced Set 2 of values for use in forming a lower byte;

FIG. 4 is a table showing the various nibble values which are available for forming either the control word or the diagnostic word;

FIG. 5 is a table showing various embodiments of the lower byte word values that can be selected to identify the four monitored voltage states;

FIG. 6 is an embodiment of a method, similar to FIG. 5, that includes columns showing selection of the upper significant nibble and lower significant nibble to form the lower byte values;

FIG. 7 is yet another embodiment of a method, similar to FIG. 6, that includes columns showing storage of a control stored value, the method including a decision dependent on the control status value matches or deviating from a defined value;

FIG. 8 is an embodiment of a method, similar to FIG. 7, further adding a diagnostic path table;

FIG. 9 is an embodiment of a method, similar to FIG. 7, further adding a second monitored voltage (Vb) table to the first monitored voltage (Va) table of FIG. 7;

FIGS. 10a and 10b illustrate a combination of the control and diagnostic tables for both monitored voltages Va and Vb;

FIGS. 13a and 13b illustrate a combination of the control and diagnostic tables, similar to FIGS. 10a and 10b, showing the control and diagnostic stored values used when the associated microprocessor includes Single bit Error Correction and Double bit Error Detection (SECDEC).

DETAILED DESCRIPTION OF THE PREFERRED EMBODIMENT

This invention concerns various embodiments directed to the efficient distribution and failsafe monitoring of power in a microcontroller system. While the various embodiments are particularly suitable for use in vehicular applications (including both automotive and truck), it will be readily appreciated that the invention and its various embodiments can be used, either singly or collectively, in other control applications having similar operating requirements. In one application, the inventions are used in a Multiple ASIL Optimized Power Supply Architecture for an electronic control module used for supervisory input processing (radar, camera, etc.) and output commands (engine torque, transmission torque, steering angle or torque, brake commands or torque, suspension commands, etc.) for driver assistance systems. The various inventions provide an integrated method or apparatus for an electronic module safety architecture which includes diversity, time and space independence for power supplies for the varied ASIL microprocessors and vehicle communication buses.

Figure 1:
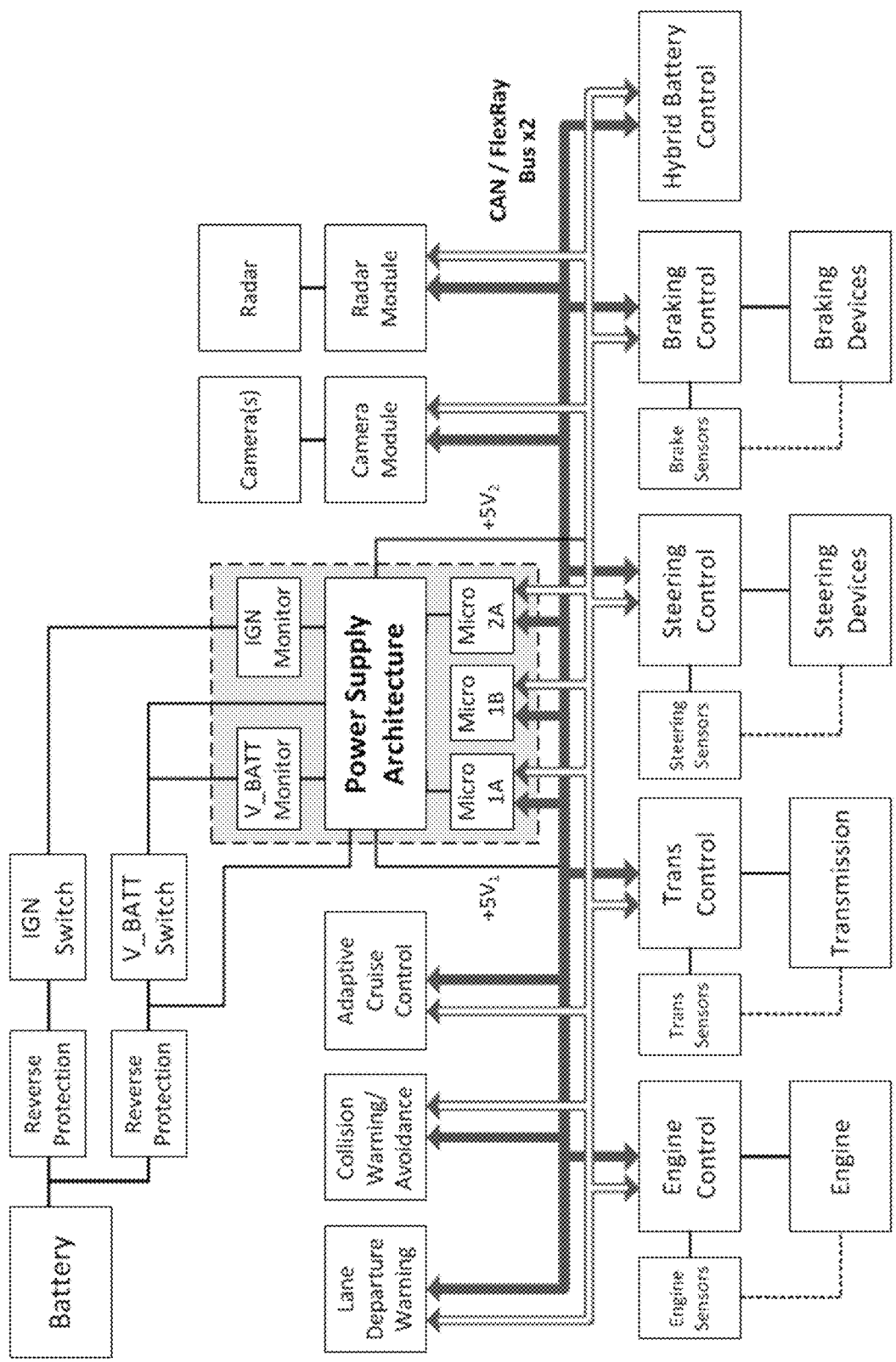
FIG. 1 is a block diagram showing one example of an operating environment for a power supply architecture embodying the principles of the invention, wherein the invention is utilized as a power supply with multiple vehicle control system.
Figure 2:
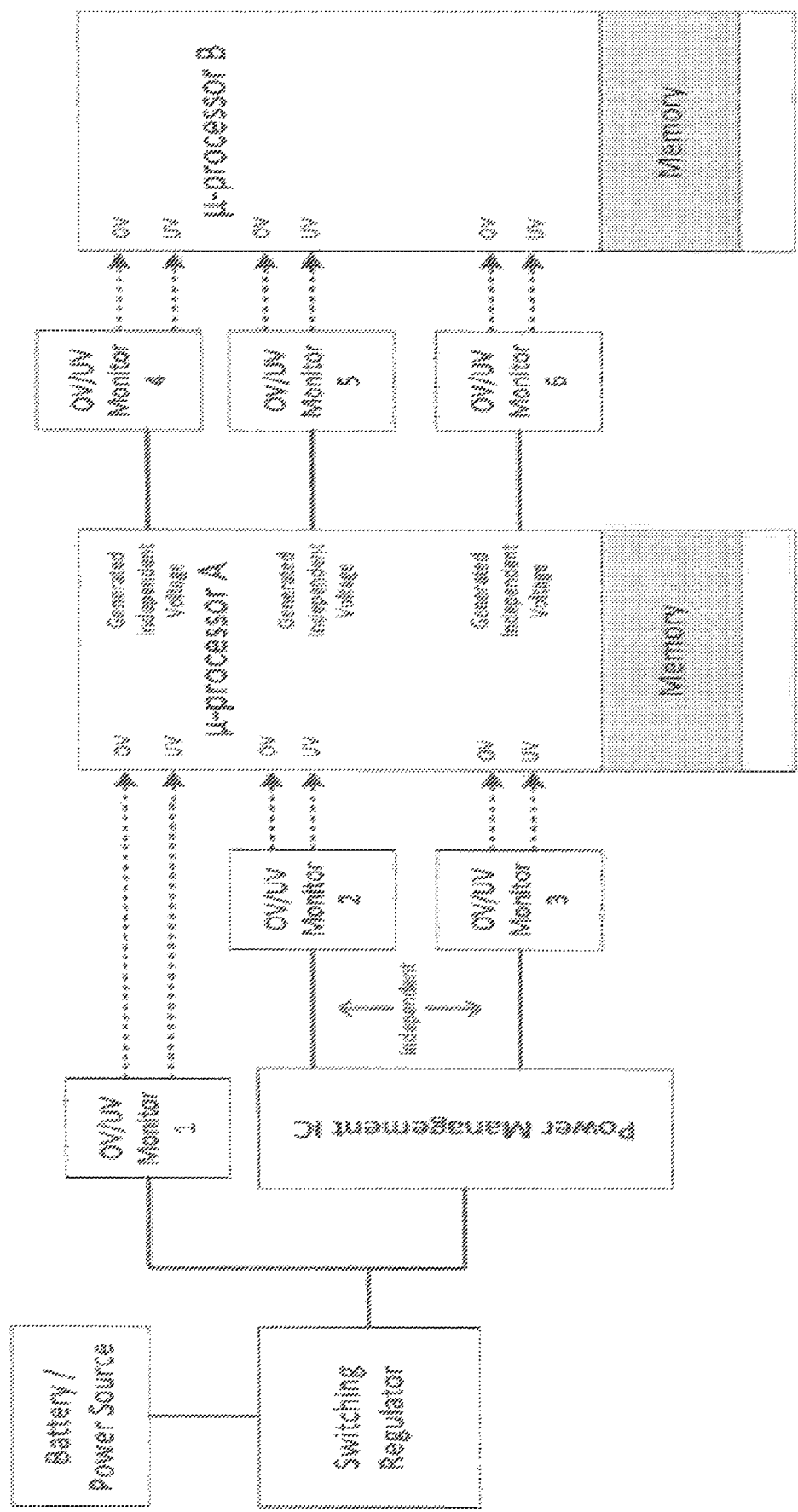
FIG. 2 is a block diagram of a portion of the power supply monitoring system of FIG. 1.

Referring now to the drawings, there is illustrated in FIG. 1 a block diagram showing one example of an operating environment for a power supply architecture embodying the principles of the invention, wherein the invention is utilized as a power supply in a vehicle control system. Generally, referring to FIG. 1, the functional aspects of the Multiple ASIL Optimized Power Supply Architecture of the electronic module may be characterized as follows:

a. includes two high integrity ASIL D compatible microprocessors (1A and 1B) for supervisory input processing and output commands for driver assistance systems.

b. receives the input processing and output command information from two or more pairs of automotive communication buses (CAN, Flexray, etc.). These communication buses transfer high integrity information. Each external bus type has a complementary role if one of them is severed. As shown in FIGS. 1 and 2, each communication bus receives power from a separate and independent power supply.

c. includes one other high throughput processing microprocessor (microprocessor 2A) with external memory. The microprocessor 2A may have a quality management (non-ASIL) hardware requirement. Alternatively, the microprocessor 2A may have a higher level designation, such as ASIL B.

d. microprocessors 1A and 2A may be used predominantly for control and microprocessor 1B may be used predominantly for checking microprocessor 1A and 2A.

e. in one alternative, a minimal set of functions microprocessor 1B is used for control and for these functions microprocessor 1A is used for checking f. providing independence between the 2 high integrity Automotive Safety Integrity Level (ASIL D) microprocessors (1A and 1B) and the high throughput processing quality management microprocessor (microprocessor 2A) with ASIL B monitoring for external microprocessor hardware.

FIG. 2 shows an exemplary power supply monitoring system representing a portion the power supply architecture of FIG. 1. in accordance with one or more of the principles of the invention disclosed herein. FIG. 2 is a schematic representation that includes several voltage-generating sources and two voltage-monitoring microprocessors, represented by microprocessor "A" and microprocessor "B." A battery and switching regulator provide an initial voltage source to the system. This source is monitored by an external circuit that produces discrete overvoltage/undervoltage outputs, depending on the state of the monitored voltage. The outputs of this monitor are read by microprocessor A. A power management IC (PMIC) sourced by the switching regulator generates additional independent voltage sources, each of which are monitored by OV/UV monitors and read by microprocessor A. Microprocessor A has the ability to generate additional independent voltage sources using power provided by both the switching regulator and PMIC. Voltages that are generated by microprocessor A are read by microprocessor B through OV/UV monitoring circuits. In a case where the PMIC fails to provide power to microprocessor A, one or more generated voltages from microprocessor A will also fail. In a case where the switching regulator fails to provide power to the PMIC and microprocessors, all generated voltages from the PMIC and microprocessors will fail in result.

As used herein, the terms "bit," "byte," "nibble," and "word" are applied in the context of computer programming and operating systems and are applied as those terms are understood in the computing art. Referring to FIG. 3, there is shown a representative table which illustrates how a full group of binary nibble values (16 in total) are selected and then segregated into Set 1 and Set 2. Set 1 is used for forming an upper byte of a word, and Set 2 is used for forming a lower byte of the word, as will be described. In particular, Set 1 is balanced, meaning each nibble includes an even number of 1's and/or 0's. Set 2 is unbalanced, meaning each nibble comprises an odd number of 1's and/or 0's. The values in each set are chosen such that they have a hamming distance of at least 2, meaning that to move from one value to another within the set, at least 2 bits must change value. Also shown in FIG. 3 is the corresponding decimal value and hex value for each nibble.

Referring to FIG. 4, there is shown in tabular form how the upper byte, selected from Set 1 values, and the lower byte, selected from Set 2 values, are combined to form either a control word or diagnostic word. In particular, the upper significant nibble of the upper byte is used to identify the particular voltage being monitored. The lower significant nibble of the upper byte is used to identify whether the particular word is a "control" word or "diagnostic" word, as will be discussed. The lower byte is used to identify the status of the particular voltage being monitored, as will be discussed.

Referring to FIG. 5, there is illustrated a simplified table showing examples of lower byte values of FIG. 4 that are selected to identify four monitored voltage states: (1) "no" over voltage, "no" under voltage; (2) "no" over voltage, "yes" under voltage; (3) "yes" over voltage, "no" under voltage; and (4) "yes" over voltage, "yes" under voltage. The lower byte, which represents the control status value, is assigned a distinct hex value, such as 74, B2, D1 and E8, corresponding to statuses (1) through (4), respectively.

FIG. 6 is similar to FIG. 5, but adds columns showing how the upper significant nibble and lower significant nibble are selected to form the lower byte values. In particular, both the upper significant nibble and the lower significant nibble of the lower byte are chosen from the unbalanced Set 2 of FIG. 3. The upper significant nibble of the lower byte comprises, e.g., values 7, B, D and E, all having a hamming distance of 2. The lower significant nibble of the lower byte comprises, e.g., values 4, 2, 1 and 8, all also having a hamming distance of 2. When combined to form the lower byte, it will be appreciated that the four distinct lower bytes have a hamming distance of 4. It should also be understood that the lower byte preferably comprises an upper significant nibble and a lower significant nibble which are not compliments of one another.

FIG. 7 is similar to FIG. 6, but adds columns showing how the control value is stored, depending on whether or not the control status value matches a defined value. After the voltage Va is read, the algorithm checks to see if the monitored value falls within the group of defined values, which in FIG. 7 are 74, B2, D1 and E8. If so, the respective value corresponding measured voltage status is stored. If not, the algorithm stores another selected value such as, e.g., F0, indicating that the control status value falls outside the group of four expected values.

FIG. 8 is similar to FIG. 7, but adds a diagnostic path table to the control path table of FIG. 7. In FIG. 8, columns showing the upper byte of the control path word are added to the control path. Also, another table representing a diagnostic path is added. In the control path, the USNb of the upper byte value (e.g., 3) corresponds to the particular voltage Va being monitored. Other monitored voltages would be identified by a different value, such as another one of the USNb values of the upper byte listed in FIG. 4. The LSNb for the upper control byte value is shown as F—this identifies the word as associated with the control path.

In FIG. 8, the diagnostic path table follows the format of the control path table, but there some important differences. Of particular importance is the lower byte, which has a value that is a "mirror" image of the control byte for the same corresponding voltage status. See, e.g., for a "no" over voltage, "no" under voltage status, the control status value is 74, while the diagnostic status value is 47. The diagnostic "no match" value is set at 0F, which is also a mirror image to the control "no match" value F0. Also, the USNb is selected (from the table of 4) to be different from the control upper byte USNb (e.g., A). And the LSNb of the diagnostic upper byte is set at 0, which is the other value available from the respective column in FIG. 4.

FIG. 9 is similar to FIG. 7, but adds a second monitored voltage (Vb) table to the first monitored voltage (Va) table of FIG. 7. It will be appreciated that the only difference between the Va table and the Vb table is a difference in the USNb of the upper byte. For the Va voltage table, the USNb has a value of 3, and for the V voltage table, the USNb has a value of A. Both of these values have been selected from FIG. 4. It is noteworthy that the control and diagnostic upper bytes are unique for each supply voltage to be monitored. This prevents a modern compiler from optimizing the algorithm and combining identical tables, which may increase the impact of systematic design errors.

FIGS. 10a and 10b are essentially a combination of FIGS. 8 and 9. Thus, the control and diagnostic tables for both monitored voltages Va and Vb are shown, with the values therein being similar to those in FIGS. 8 and 9.

Figure 11:
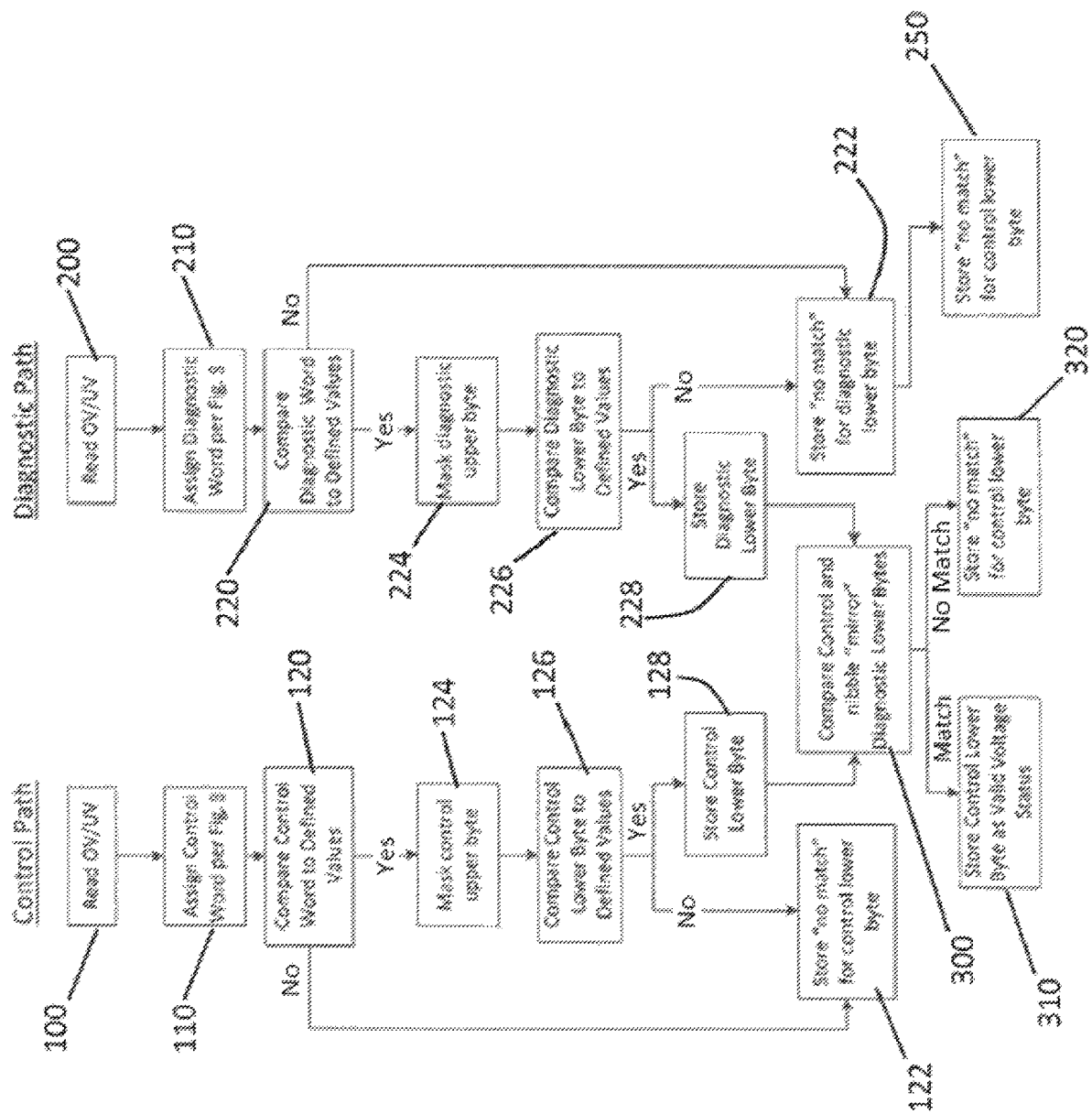
FIG. 11 is a flowchart of an algorithm of a method configured to prevent systematic errors when storing power supply states in memory location.

FIG. 11 describes the process for which a monitoring input is analyzed and stored. Independent control and diagnostic paths individually read and store the monitoring inputs using the tables described in FIG. 8. The stored results of these paths are eventually compared to distinguish a true hardware failure from a systematic failure. Starting at step 100, the monitoring input is read by the control path. This input is assigned a word value in step 110 based on FIG. 8. In step 120, the algorithm confirms that the word matches a set of defined values. If it does not match, a "no match" value is stored for the control lower byte at step 122. Otherwise, the upper byte of the word is masked at step 124 and the lower byte is checked against a set of defined lower byte values at step 126. If it does not match defined byte values, a "no match" value is stored for the control lower byte, again at step 122. Otherwise, the matching byte value is stored for the control lower byte, step 128.

The diagnostic path performs a similar operation to the control path, as represented by steps 200-228. The monitoring input is read by the control path at step 200 and assigned a word based on FIG. 8 at step 210. The upper byte of the diagnostic word is unique from the control upper byte, with a hamming distance of 6. The diagnostic lower byte is the complementary nibble "mirror" of the control lower byte, with a hamming distance of 4. The diagnostic word is checked to match a defined set of valid diagnostic words at step 220. If it does not match, a "no match" value is stored for the diagnostic lower byte, step 222. As a result, a "no match" value is also stored for the control lower byte in step 250. This additional step allows the diagnostic path to be functionally different from the control path, and thus reduces the risk of systematic error by preventing a modern compiler from combining the paths for optimization. If the diagnostic word matches a defined value, its upper byte is masked (step 224), and the lower byte is compared against defined values (step 226). A lower byte that does not match a defined value is stored as a "no match" value for the diagnostic and control lower bytes. Otherwise, the matching value is stored as the diagnostic lower byte (step 228).

If the control and diagnostic paths store defined lower byte values, these bytes are expected to be complementary nibble "mirrors", introduced in FIG. 8. If they match as "mirrors" in step 300, the control lower byte is stored as a valid voltage status (step 310). If the nibbles do not match as "mirrors" then a software or systematic error has occurred in the algorithm, and a "no match" value is ultimately stored for the control lower byte (step 320).

Figure 12:
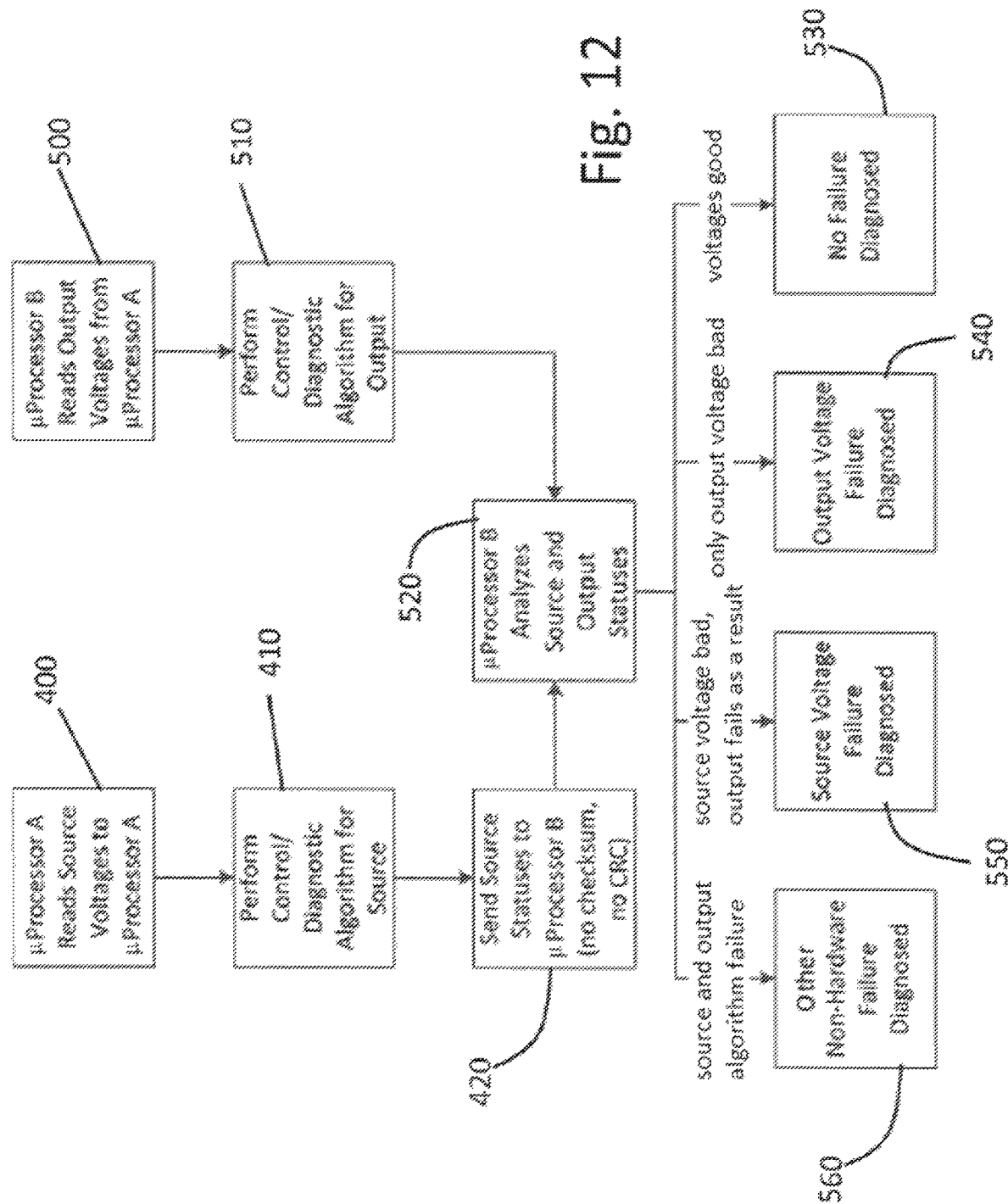
FIG. 12 is a flowchart of an embodiment of a method including a diagnostic approach to determine where a power supply error occurs and whether or not that error is systematic.

FIG. 12 describes the process in which a processor uses the algorithm in FIG. 10 and compares multiple voltage monitors through independent diagnostic paths to determine the cause of a diagnostic failure and its location. This flowchart describes one particular case of diagnosing a failure in FIG. 1, where an input voltage to microprocessor A is analyzed along with an output voltage from processor A.

At step 400, sources voltages to microprocessor A are read by microprocessor A itself. At the same time in step 500, microprocessor B reads the generated voltage outputs from processor A. During steps 410 and 510, both microprocessors perform the Control/Diagnostic algorithm described in FIG. 10. In this embodiment of the invention, microprocessor B analyzes diagnostic statuses across multiple voltages. Therefore, source voltage statuses stored in microprocessor A will be sent to microprocessor B in step 420. In this transmission, no checksum or cyclic redundancy check (CRC) is performed. This is due to the fact that the algorithm in FIG. 10 guards against data/memory corruption without needing to slow down a transmission by using checksum or CRC.

By knowing which voltages failed and the means by which they failed, microprocessor B is able to thoroughly diagnose the root of the failure. Step 520 involves microprocessor B analyzing voltage status bytes from the two independent paths in the circuit. If both status bytes are good, no failure is diagnosed (step 530). If the output voltage of microprocessor A is bad, and the source voltage of microprocessor A is good, then a failed output voltage is diagnosed (step 540). If the source voltage is bad and the output voltage fails as a result, then a source voltage failure is diagnosed (step 550). Lastly, if there is a source and output algorithm failure, then a non-hardware failure is diagnosed (step 560), which could be the cause of a systematic design error.

FIGS. 13a and 13b are similar to FIGS. 10a and 10b, but show the control and diagnostic tables for both Va and Vb in the event the associated microprocessor has Single bit Error Correction and Double bit Error Detection (SECDEC). In this case, the entire lower byte need not be compared. The control and diagnostic paths can be compared either with the lower byte USNb or LSNb. To mitigate for systematic errors with an SECDEC microprocessor, it is preferable to compare the USNB for the processor's voltage supply and the LSNb for the complementary processor's voltage supply. As noted in FIGS. 13a and 13b, the Va control stored value (for a no-no voltage status is the USNb for the lower byte (e.g., 7), while the Vb control stored value is the LSNb for the lower byte (e.g., 4). For the Va diagnostic stored value, the LSNb of the "mirrored" lower byte is used (e.g., 7). For the Vb voltage diagnostic store value, the USNb of the "mirrored" lower byte is used (e.g., 4).

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method for diagnosing the status of an operating voltage comprising the steps of:
   (a) using a regulated voltage power supply to generate an operating voltage;
   (b) supplying the operating voltage to an over voltage/under voltage monitor, the monitor generating a first status signal indicating when an over voltage condition exists and a second status signal indicating when an under voltage condition exists;
   (c) using a processor to read the first and second status signals and to determine one of the following states: (1) "no" OV, "no" UV; (2) "no" OV, "yes" UV; (3) "yes" OV, "no" UV or (4) "yes" OV, "yes" UV;
   (d) assigning a distinct byte value for each of the states identified in step (c), wherein each distinct byte value includes a USNb and a LSNb, and wherein all of the USNbs are distinct and are selected having a hamming distance of at least 2, and all the LSNbs are distinct and are selected having a hamming distance of at least 2, and wherein the distinct values are selected having a hamming distance of at least 4; and
   (e) storing an operating status value corresponding to the determined operating state in a designated memory location of the processor.

2. The method of claim 1 wherein each of the USNbs and LSNbs are chosen from an unbalanced set of nibble values.

3. The method of claim 2 wherein each of the USNbs and LSNbs are chosen for each distinct value such that they are not complements of one another.

4. The method of claim 2 wherein the unbalanced set of nibbles include hex values 1, 2, 4, 7, 8, B, D and E.

5. The method of claim 4 wherein the USNbs are selected from the group 7, B, D and E and the LSNbs are selected from the group 1, 2, 4 and 8.

6. The method of claim 5 wherein the distinct values of step (d) include 74, B2, D1 and E8.

7. The method of claim 1 wherein, prior to step (e), the distinct byte value is checked for a match with one of a group of defined values and, if there is a match, the distinct byte value is stored as the operating status value and, if there is no match, a separate "no match" value is stored.

8. A method for diagnosing the status of an operating voltage comprising the steps of:
 (a) using a regulated voltage power supply to generate an operating voltage;
 (b) supplying the operating voltage to an over voltage/under voltage monitor, the monitor generating a first status signal indicating when an over voltage condition exists and a second status signal indicating when an under voltage condition exists;
 (c) using a processor to read the first and second status signals and to determine one of the following states: (1) "no" OV, "no" UV; (2) "no" OV, "yes" UV; (3) "yes" OV, "no" UV or (4) "yes" OV, "yes" UV;
 (d) assigning a distinct byte value for each of the states identified in step (c), wherein the distinct values are selected having a hamming distance of at least 4 wherein the distinct byte value is a lower byte of a word,
 (e) assigning an upper byte value to the word, the upper byte value including a USNb and a LSNb, and wherein one of the USNb and LSNb is a monitored voltage identifier and the other one is a control/diagnostic path identifier; and
 (f) storing an operating status value corresponding to the determined operating state in a designated memory location of the processor.

9. The method of claim 8 wherein each of the USNbs and LSNbs of the upper byte are chosen from an balanced set of nibble values.

10. A method for diagnosing the status of an operating voltage comprising the steps of:
 (a) using a regulated voltage power supply to generate the operating voltage;
 (b) supplying the operating voltage to an over voltage/under voltage monitor, the monitor generating a first status signal indicating when an over voltage condition exists and a second status signal indicating when an under voltage condition exists;
 (c) using a processor to read the first and second status signals and to determine one of the following control states: (1) "no" OV, "no" UV; (2) "no" OV, "yes" UV; (3) "yes" OV, "no" UV or (4) "yes" OV, "yes" UV;
 (d) assigning a distinct control byte value for each of the control states identified in step (c) wherein each distinct control byte value includes a USNb and a LSNb, and wherein all of the USNbs and LSNbs are distinct;
 (e) storing an operating control status value corresponding to the determined operating state in a designated control memory location of the processor;
 (f) using the processor of step (c) to read the operating voltage and to determine one of the following diagnostic states: (1) "no" OV, "no" UV; (2) "no" OV, "yes" UV; (3) "yes" OV, "no" UV or (4) "yes" OV, "yes" UV;
 (g) assigning a distinct diagnostic byte value for each of the states identified in step (d);
 (h) storing an operating diagnostic status value corresponding to the determined operating state in a designated diagnostic memory location of the processor; and
 (i) comparing the operating control status value with the operating diagnostic status value to determine whether the control voltage state read in step (c) agrees with the diagnostic voltage state read in step (f).

11. The method of claim 10 wherein each distinct diagnostic byte value of step (h) includes a USNb and a LSNb, and wherein all of the USNbs and LSNbs are distinct.

12. The method of claim 11 wherein the USNb and LSNb of the diagnostic byte value are mirrored with respect to the USNb and LSNb of the corresponding control byte value.

13. The method of claim 12 wherein both the USNb and LSNb of the diagnostic byte value are compared to the mirrored USNb and LSNb of the corresponding control byte value.

14. The method of claim 12 wherein only one of the USNb and LSNb of the diagnostic byte value is compared to one of the mirrored USNb and LSNb of the corresponding control byte value.

15. A method for diagnosing the status of an operating voltage comprising the steps of:
 (a) using a regulated voltage power supply to generate the operating voltage;
 (b) supplying the operating voltage to an over voltage/under voltage monitor, the monitor generating a first status signal indicating when an over voltage condition exists and a second status signal indicating when an under voltage condition exists;
 (c) using a processor to read the first and second status signals and to determine one of the following control states: (1) "no" OV, "no" UV; (2) "no" OV, "yes" UV; (3) "yes" OV, "no" UV or (4) "yes" OV, "yes" UV;
 (d) assigning a distinct control byte value for each of the control states identified in step (c);
 (e) checking the distinct control byte value for a match with one of a group of defined control values and, if there is a match, storing the distinct control byte value corresponding to the determined operating state in a designated control memory location of the processor as an operating control status value and, if there is no match, storing a separate "no match" control value;
 (f) using the processor of step (c) to read the operating voltage and to determine one of the following diagnostic states: (1) "no" OV, "no" UV; (2) "no" OV, "yes" UV; (3) "yes" OV, "no" UV or (4) "yes" OV, "yes" UV;
 (g) assigning a distinct diagnostic byte value for each of the states identified in step (d);
 (h) storing an operating diagnostic status value corresponding to the determined operating state in a designated diagnostic memory location of the processor; and
 (i) comparing the operating control status value with the operating diagnostic status value to determine whether the control voltage state read in step (c) agrees with the diagnostic voltage state read in step (f).

16. A method for diagnosing the status of an operating voltage comprising the steps of:
 (a) using a regulated voltage power supply to generate the operating voltage;
 (b) supplying the operating voltage to an over voltage/under voltage monitor, the monitor generating a first status signal indicating when an over voltage condition exists and a second status signal indicating when an under voltage condition exists;
 (c) using a processor to read the first and second status signals and to determine one of the following control states: (1) "no" OV, "no" UV; (2) "no" OV, "yes" UV; (3) "yes" OV, "no" UV or (4) "yes" OV, "yes" UV;
 (d) assigning a distinct control byte value for each of the control states identified in step (c);

(e) storing an operating control status value corresponding to the determined operating state in a designated control memory location of the processor;
(f) using the processor of step (c) to read the operating voltage and to determine one of the following diagnostic states: (1) "no" OV, "no" UV; (2) "no" OV, "yes" UV; (3) "yes" OV, "no" UV or (4) "yes" OV, "yes" UV;
(g) assigning a distinct diagnostic byte value for each of the states identified in step (d);
(h) checking the distinct diagnostic byte value for a match with one of a group of defined diagnostic values and, if there is a match, storing the distinct diagnostic byte value corresponding to the determined operating state in a designated diagnostic memory location of the processor as an operating diagnostic status value and, if there is no match, storing a separate "no match" diagnostic value; and
(i) comparing the operating control status value with the operating diagnostic status value to determine whether the control voltage state read in step (c) agrees with the diagnostic voltage state read in step (f).

17. A method of analyzing a power supply system wherein a source input voltage is supplied to a first processor and an output voltage is generated by the first processor comprising:
(a) using the first processor to determine a source operating status of the source input voltage;
(b) using a second processor to determine an output operating status of the output voltage from the first processor;
(c) sending the source operating status to the second processor with no checksum or cyclic redundancy check (CRC); and
(d) using the second processor to analyze the source and output statuses to determine a system diagnosis as a function of both the source and output statuses.

* * * * *